US00RE46743E

(19) United States
(12) Reissued Patent
Davis

(10) Patent Number: US RE46,743 E
(45) Date of Reissued Patent: Mar. 6, 2018

(54) JEANS

(71) Applicant: Terry Louise Davis, Cary, NC (US)

(72) Inventor: Terry Louise Davis, Cary, NC (US)

(21) Appl. No.: 29/581,387

(22) Filed: Oct. 18, 2016

Related U.S. Patent Documents

Reissue of:
(64) Patent No.: Des. 730,018
Issued: May 26, 2015
Appl. No.: 29/435,232
Filed: Oct. 22, 2012

U.S. Applications:
(63) Continuation of application No. 29/428,904, filed on Aug. 3, 2012, now Pat. No. Des. 731,751.

(51) LOC (11) Cl. ..... 02-02
(52) U.S. Cl.
USPC ..... D2/742
(58) Field of Classification Search
USPC ..... D2/742, 712, 731, 738, 748, 851, 853, D2/871
CPC ..... A41F 15/007; A41F 19/00; A41F 9/00; A41F 1/02; A41D 1/08; A41D 1/06
See application file for complete search history.

(56) References Cited

U.S. PATENT DOCUMENTS 231,155 A * 8/1880 Dinsmore ..... D05B 29/06 112/2
871,426 A 11/1907 Melanson ..... A41F 9/00 2/220
1,120,814 A 12/1914 Hebbard ..... A41D 1/18 2/106
1,128,824 A 2/1915 Struck ..... A41D 1/06 2/235
1,471,604 A 10/1923 Heller ..... A41F 9/00 2/266
D231,155 S 4/1974 Bowcut
4,164,044 A 8/1979 Holmes ..... A41F 9/025 2/237
4,215,435 A 8/1980 Miele ..... A41D 15/002 2/227

(Continued)

*Primary Examiner* — Philip S Hyder
(74) *Attorney, Agent, or Firm* — Lane Powell, PC

(57) CLAIM

I claim the ornamental design for jeans, as shown and described.

DESCRIPTION

Figure 1:
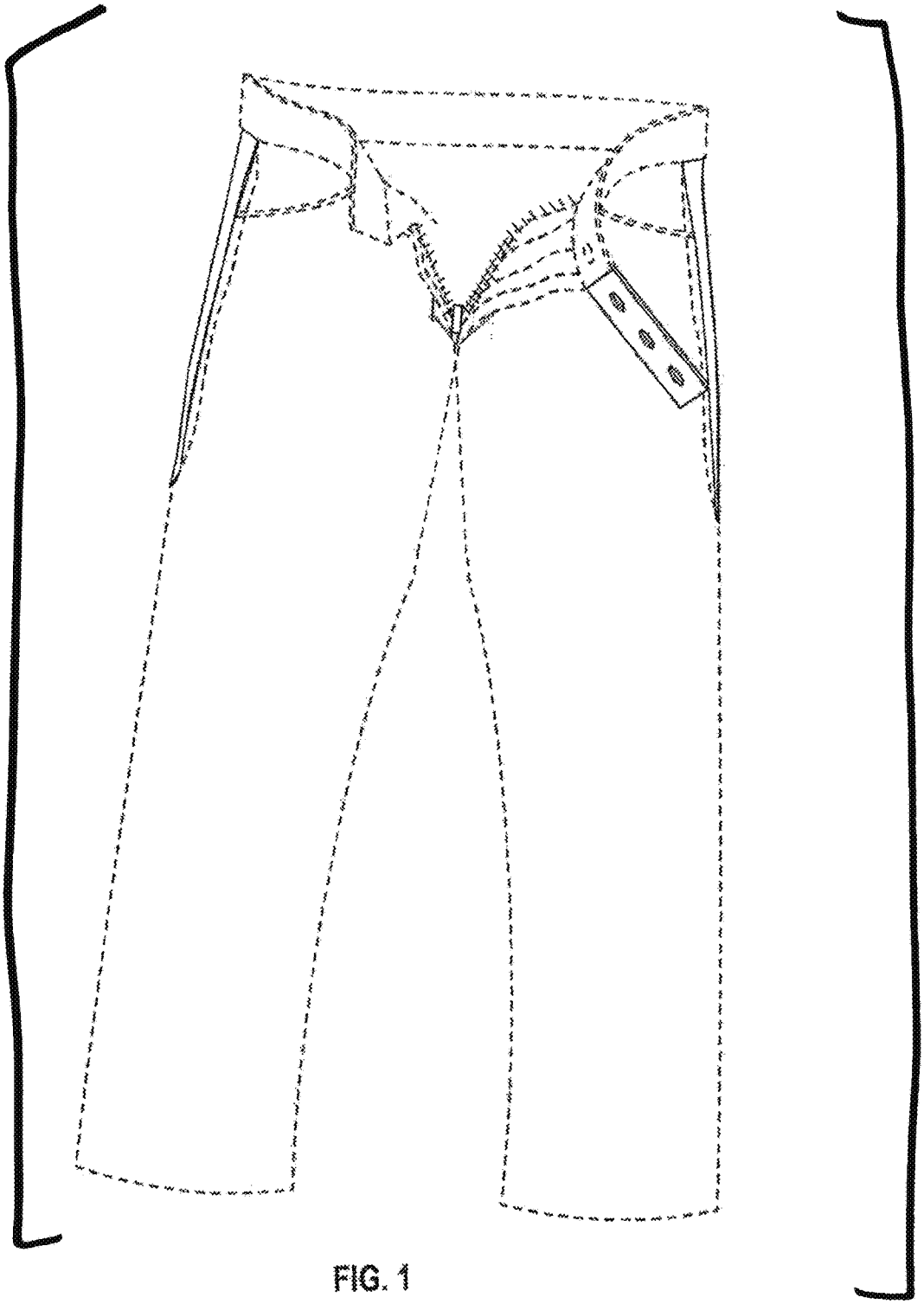
Figure 2:
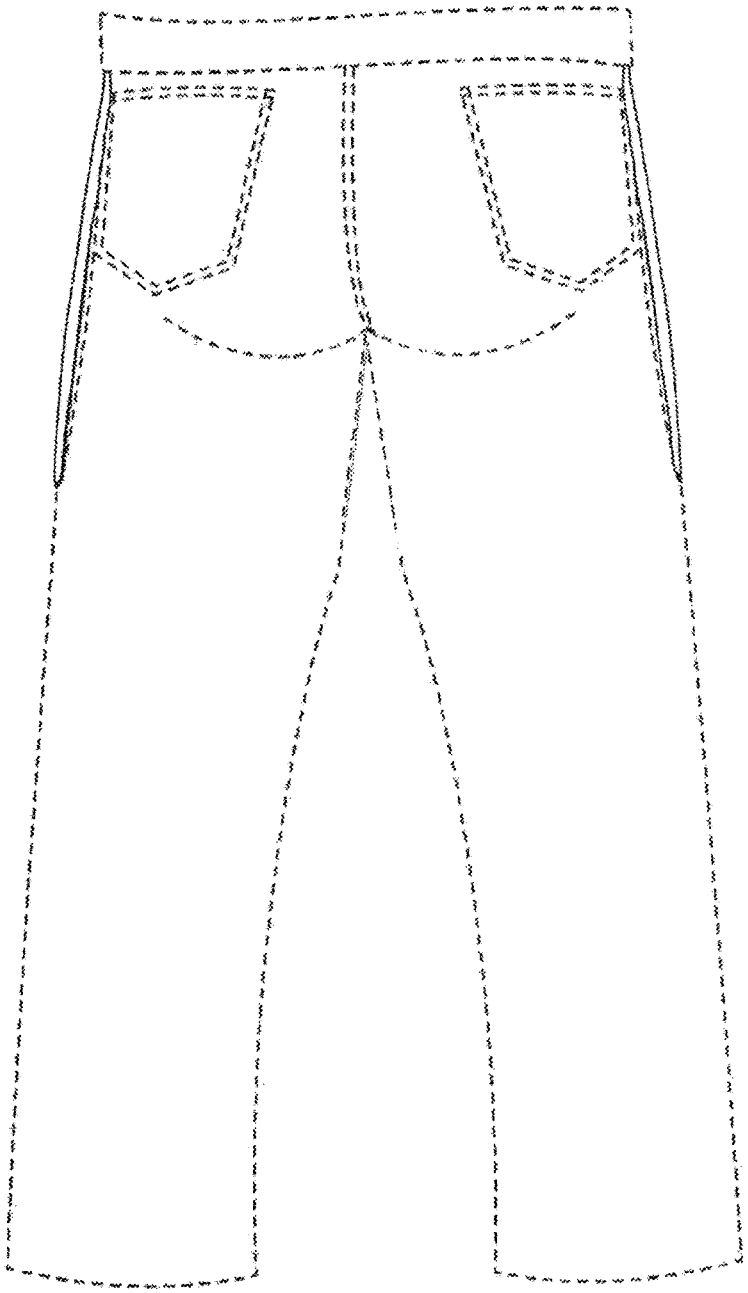
Figure 3:
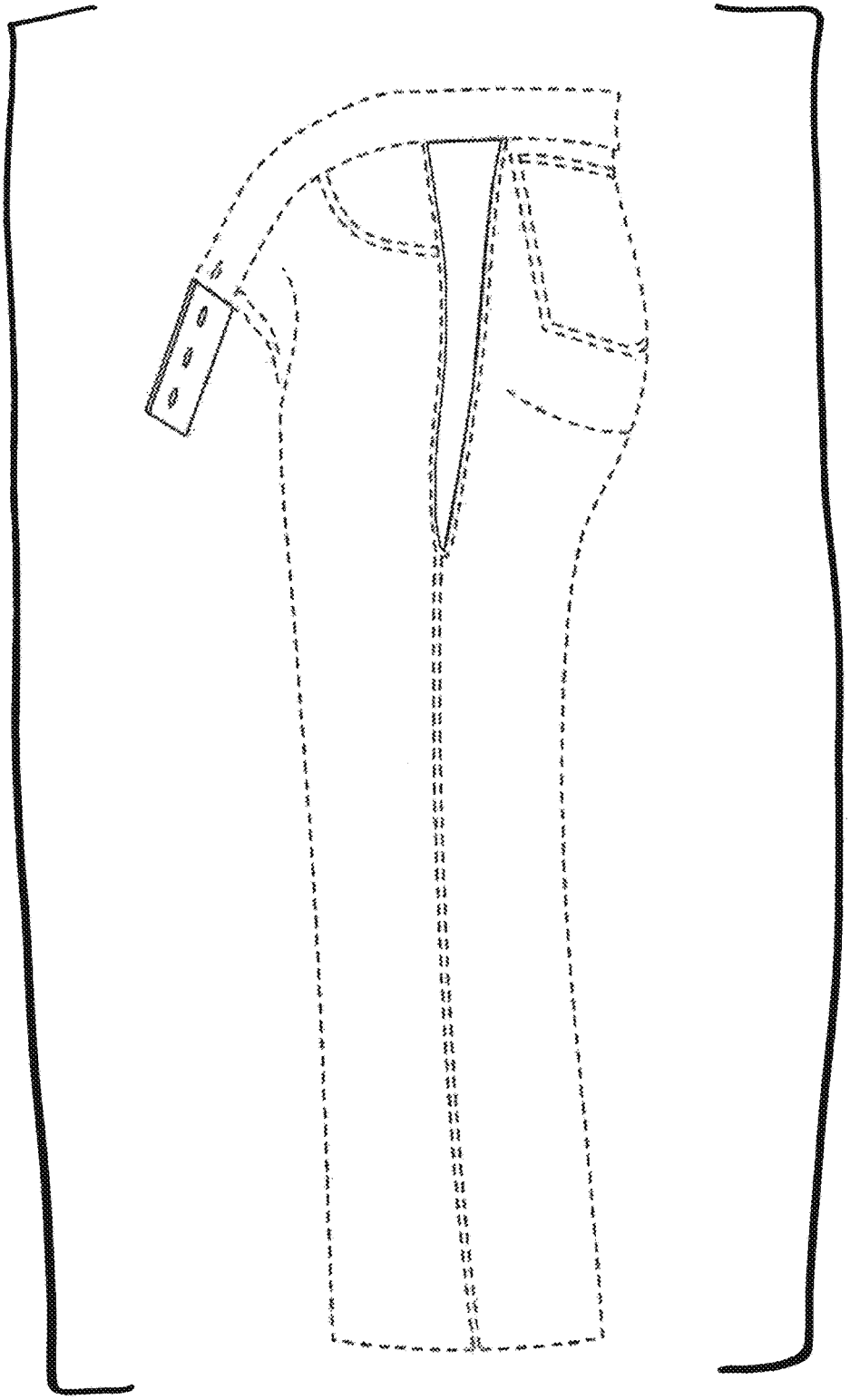
Figure 4:
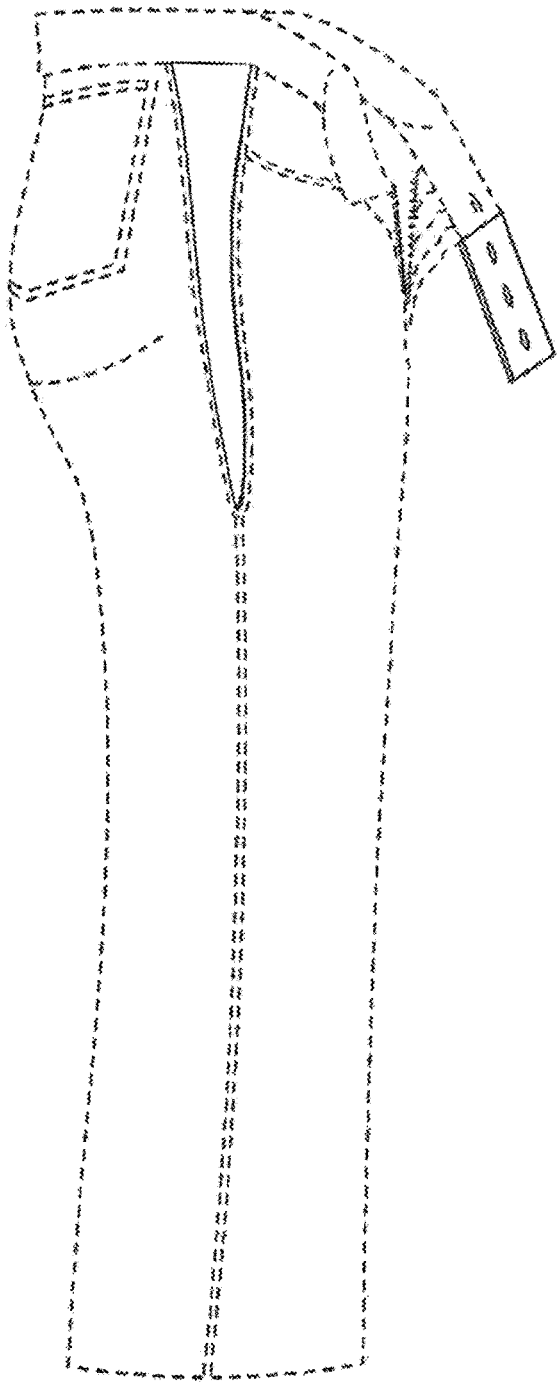
Figure 5:
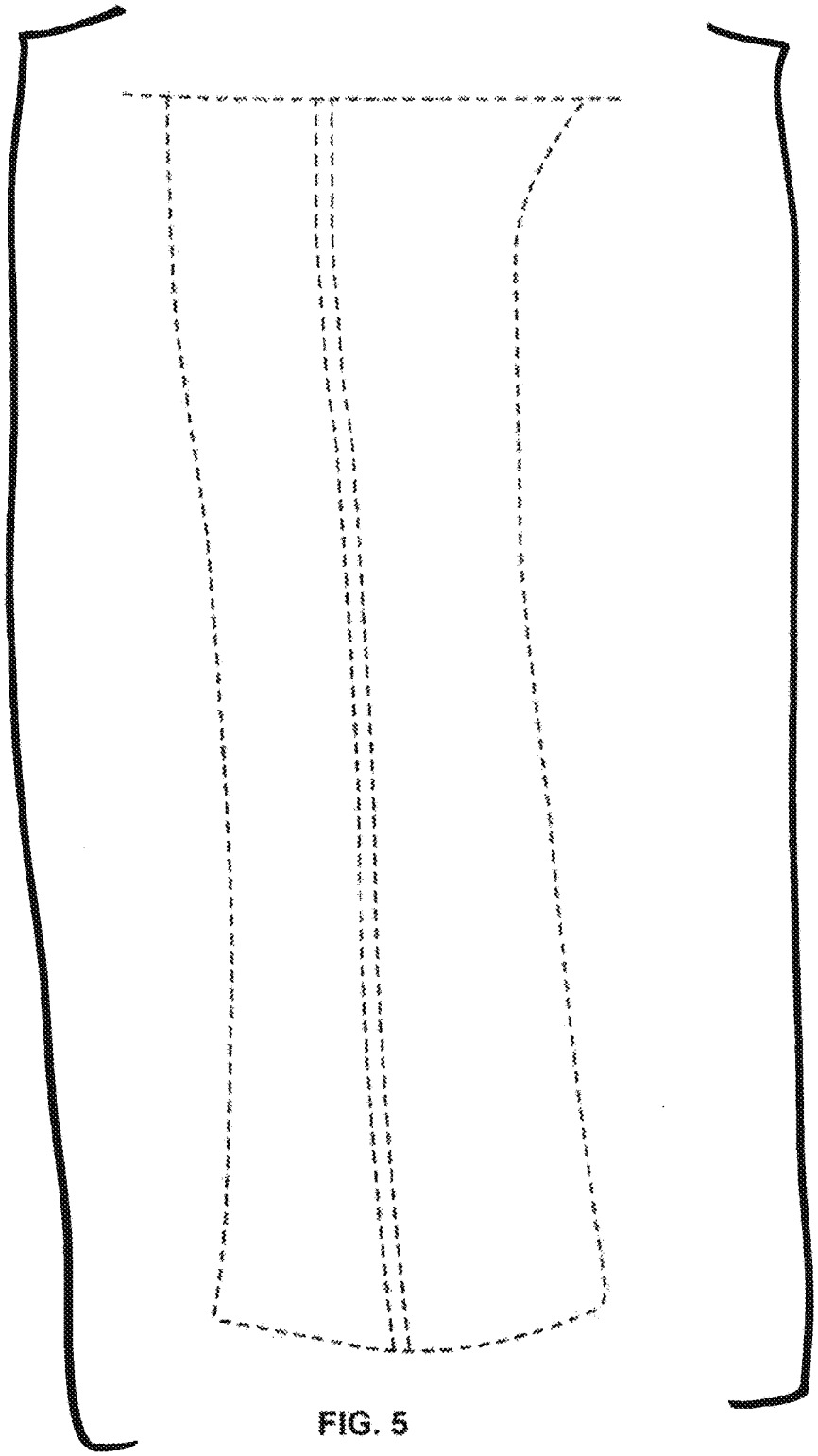

[FIG. 1 is a front view of the jeans.]
[FIG. 2 is a rear view of the jeans.]
[FIG. 3 is a side view of the jeans.]
[FIG. 4 is a second side view of the jeans.]
[FIG. 5 is a top-down view of the jeans.]
[FIG. 6 is a bottom-up view of the jeans; and.]
[FIG. 7 is a side view of the inseam portion of the jeans.]
*FIG. 6 is a front view of the jeans,*
*FIG. 7 is a rear view of the jeans,*
*FIG. 8 is a side view of the jeans; and,*
*FIG. 9 is a second side view of the jeans.*
The broken line showing of the jeans is for the purpose of illustrating portions of the article and forms no part of the claimed design.

1 Claim, 9 Drawing Sheets

Matter enclosed in heavy brackets [ ] appears in the original patent but forms no part of this reissue; matter printed in italics indicates the additions made by reissue.

NEW

(56) References Cited

U.S. PATENT DOCUMENTS

| | | | | | |
|---|---|---|---|---|---|
| D261,323 | S | * | 10/1981 | Catron | D2/742 |
| 4,332,034 | A | | 6/1982 | Muse | A41F 9/02 2/221 |
| 4,850,056 | A | * | 7/1989 | Gardner et al. | A41D 1/08 2/227 |
| 5,008,962 | A | | 4/1991 | Smith et al. | A41D 1/06 2/227 |
| 6,055,673 | A | | 5/2000 | McCormick | A41D 15/002 2/227 |
| D469,946 | S | | 2/2003 | Hansen et al. | D2/742 |
| D505,772 | S | | 6/2005 | Helbing et al. | D2/743 |
| D527,170 | S | | 8/2006 | Chionna | D2/742 |
| D527,512 | S | | 9/2006 | Chionna | D2/742 |
| D534,708 | S | * | 1/2007 | Helbing et al. | D2/742 |
| D536,159 | S | | 2/2007 | Helbing et al. | D2/851 |
| D537,237 | S | * | 2/2007 | Chionna | D2/742 |
| D543,336 | S | * | 5/2007 | Tsai | D2/742 |
| D547,530 | S | * | 7/2007 | Lubell | D2/742 |
| D598,180 | S | * | 8/2009 | Fu | D2/742 |
| D607,182 | S | * | 1/2010 | Peters | D2/851 |
| D609,430 | S | * | 2/2010 | Clement | D2/742 |
| D609,881 | S | * | 2/2010 | Chen et al. | D2/742 |
| 7,836,524 | B2 | | 11/2010 | Muench | A41D 1/086 2/227 |
| 7,926,122 | B1 | | 4/2011 | Countryman | A41D 1/06 2/227 |
| D656,299 | S | | 3/2012 | Peters | D2/742 |
| D680,299 | S | * | 4/2013 | Scott | D2/742 |
| D681,311 | S | * | 5/2013 | McLaren et al. | D2/742 |
| 8,464,365 | B1 | | 6/2013 | Nunn et al. | A41D 1/08 2/227 |
| D686,800 | S | * | 7/2013 | Kelly | D2/742 |

* cited by examiner

[CANCELLED]

[CANCELLED]

[CANCELLED]

[CANCELLED]

[CANCELLED]

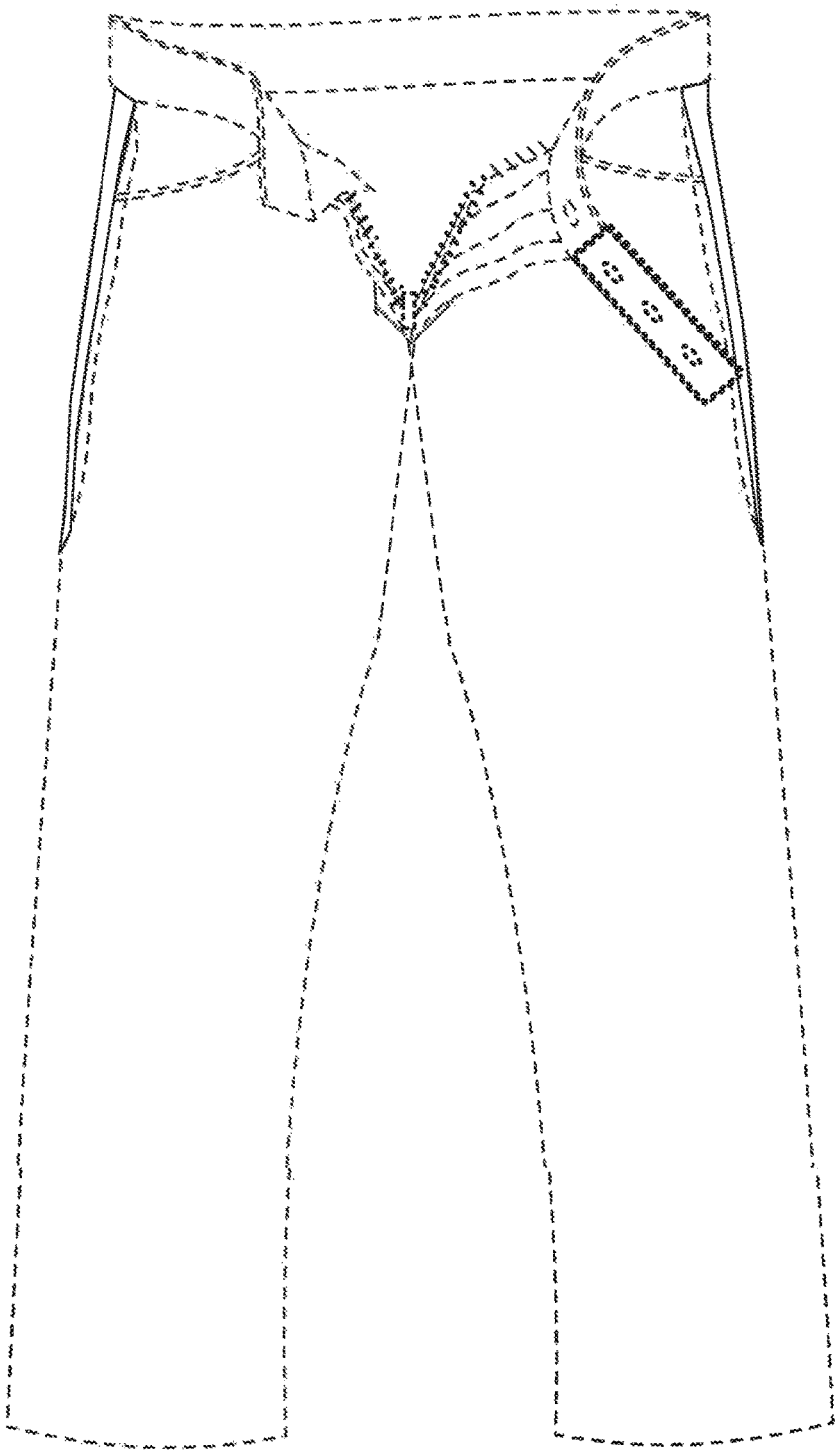
FIG. 6
NEW

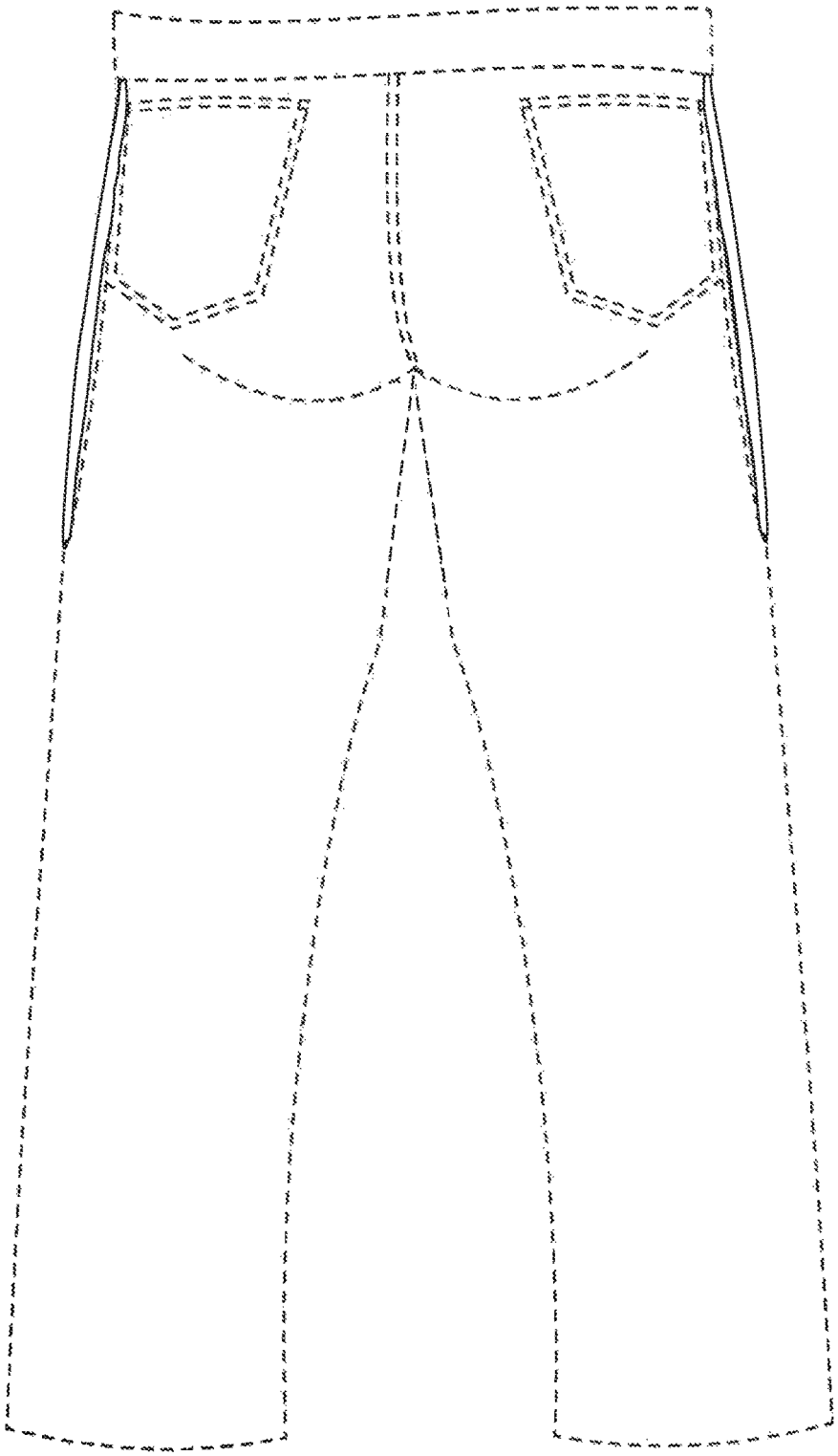
FIG. 7
NEW

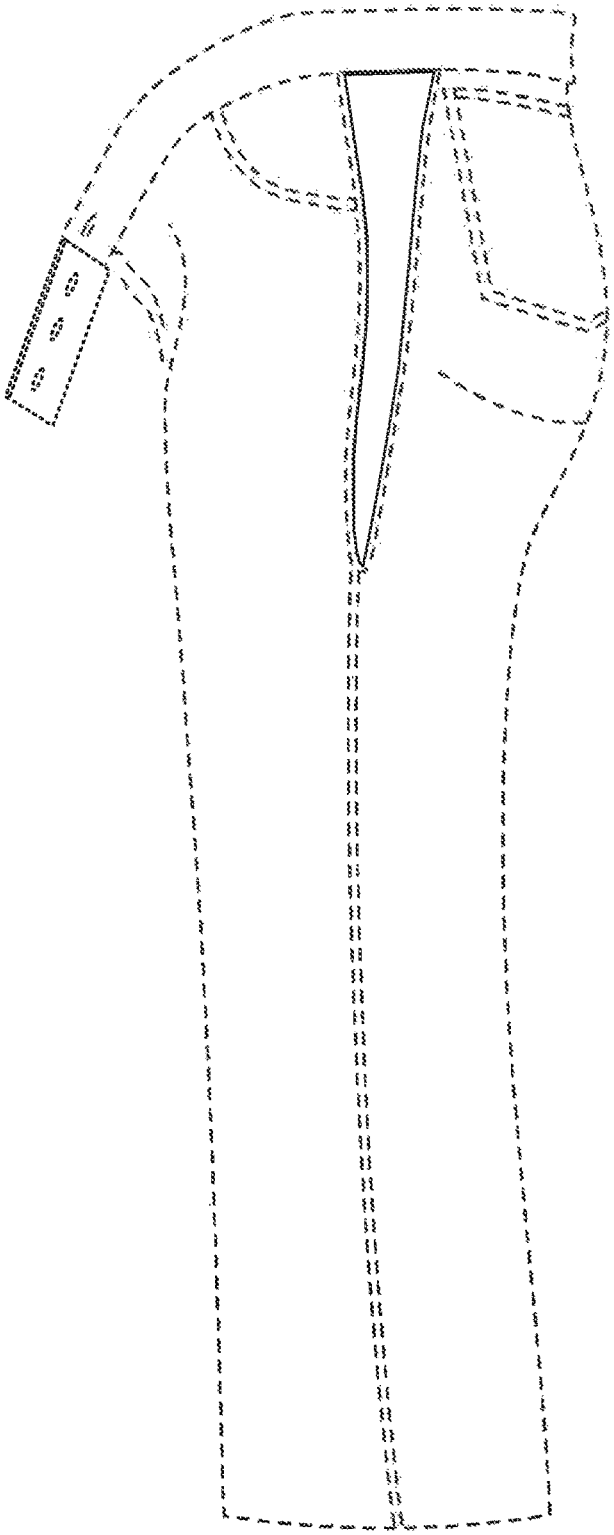
FIG. 8
NEW

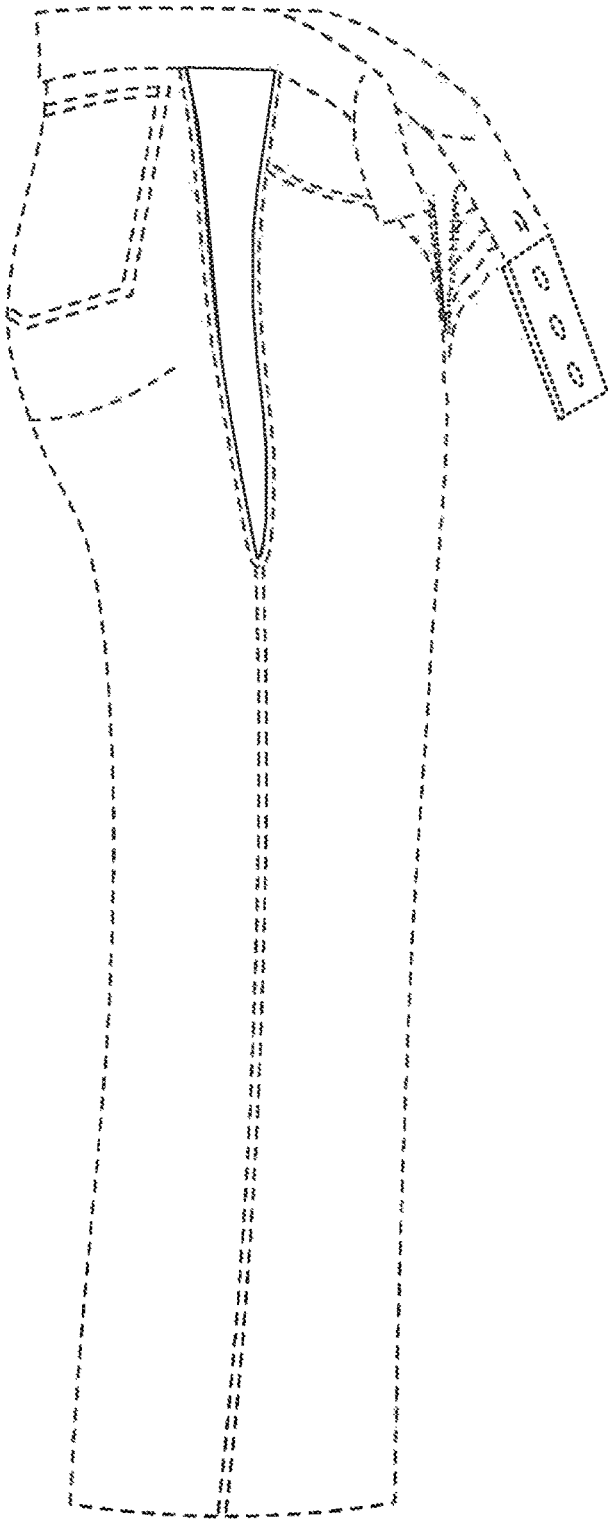
FIG. 9
NEW